(12) United States Patent
Steinkogler et al.

(10) Patent No.: US 10,597,068 B2
(45) Date of Patent: Mar. 24, 2020

(54) VEHICLE STEERING SYSTEM WITH STEER-BY-WIRE SYSTEM AND MECHANICAL FALLBACK SYSTEM

(71) Applicants: THYSSENKRUPP PRESTA AG, Eschen (LI); thyssenkrupp AG, Essen (DE)

(72) Inventors: Bernhard Steinkogler, Dornbirn (AT); Robert Galehr, Schaanwald (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 255 days.

(21) Appl. No.: 15/580,577

(22) PCT Filed: Jun. 3, 2016

(86) PCT No.: PCT/EP2016/062613
§ 371 (c)(1),
(2) Date: Dec. 7, 2017

(87) PCT Pub. No.: WO2016/198327
PCT Pub. Date: Dec. 15, 2016

(65) Prior Publication Data
US 2018/0154925 A1 Jun. 7, 2018

(30) Foreign Application Priority Data
Jun. 10, 2015 (DE) .................. 10 2015 007 280

(51) Int. Cl.
*B62D 5/00* (2006.01)
*F16D 27/108* (2006.01)
(52) U.S. Cl.
CPC ............. *B62D 5/003* (2013.01); *B62D 5/001* (2013.01); *B62D 5/006* (2013.01); *F16D 27/108* (2013.01); *F16D 2300/14* (2013.01)

(58) Field of Classification Search
CPC ........ B62D 5/003; B62D 5/001; B62D 5/006; F16D 27/108
(Continued)

(56) References Cited

U.S. PATENT DOCUMENTS 4,984,668 A 1/1991 Onishi
9,340,226 B2 * 5/2016 Osonoi .................. B62D 1/16
(Continued)

FOREIGN PATENT DOCUMENTS

CN 103129602 A 6/2012
CN 103633813 A 3/2014
(Continued)

OTHER PUBLICATIONS

English Translation of International Search Report issued in PCT/EP2016/062613, dated Feb. 10, 2017 (dated Feb. 21, 2017).

*Primary Examiner* — Jacob D Knutson
(74) *Attorney, Agent, or Firm* — thyssenkrupp North America, Inc.

(57) ABSTRACT

A motor vehicle steering system with steer-by-wire functionality may include an upper steering shaft that is mounted in a steering column and can be connected to a steering wheel in a rotationally fixed manner, a lower steering shaft that is connected to a steering gear for pivoting at least one steerable wheel, a manual torque adjuster that is connected to the upper steering shaft, an actuating drive that is connected to the lower steering shaft, and a coupling that in a closed state couples the steering wheel and the steering gear in a rotationally fixed manner. The actuating drive may be disposed on the steering column.

11 Claims, 4 Drawing Sheets

(58) Field of Classification Search
 USPC .......................................................... 180/402
 See application file for complete search history.

(56) References Cited

U.S. PATENT DOCUMENTS

| | | | |
|---|---|---|---|
| 9,393,992 B2* | 7/2016 | Ognibene | ................ B62D 5/32 |
| 2004/0238258 A1* | 12/2004 | Ono | ....................... B62D 1/163 |
| | | | 180/402 |
| 2005/0045413 A1* | 3/2005 | Shitamitsu | ............. B62D 5/003 |
| | | | 180/402 |
| 2006/0289227 A1* | 12/2006 | Chino | .................... B62D 1/163 |
| | | | 180/402 |
| 2007/0256885 A1* | 11/2007 | Ammon | ................ B62D 5/008 |
| | | | 180/417 |
| 2016/0297468 A1* | 10/2016 | Izutani | ................... B62D 5/003 |

FOREIGN PATENT DOCUMENTS

| | | | | |
|---|---|---|---|---|
| DE | 3809192 | A | 9/1988 | |
| DE | 10046168 | A | 3/2002 | |
| DE | 10160717 | A | 6/2003 | |
| DE | 20305308 | U | 8/2003 | |
| DE | 20305308 | U1 * | 8/2003 | ............. B62D 5/003 |
| DE | 10340369 | A1 | 3/2005 | |
| DE | 102006017728 | A1 | 10/2007 | |
| DE | 102012024037.6 | A | 2/2017 | |
| EP | 0447626 | A | 9/1991 | |
| EP | 1508493 | A | 2/2005 | |
| EP | 2085292 | A | 8/2009 | |
| WO | 2014038452 | A | 3/2014 | |

* cited by examiner

VEHICLE STEERING SYSTEM WITH STEER-BY-WIRE SYSTEM AND MECHANICAL FALLBACK SYSTEM

CROSS REFERENCE TO RELATED APPLICATIONS

This application is a U.S. National Stage Entry of International Patent Application Serial Number PCT/EP2016/062613, filed Jun. 3, 2016, which claims priority to German Patent Application No. DE 10 2015 007 280.3, filed Jun. 10, 2015, the entire contents of both of which are incorporated herein by reference.

FIELD

The present disclosure generally relates to steering systems, including vehicle steer-by-wire steering systems and mechanical fallback systems.

BACKGROUND

Steer-by-wire steering systems are steering systems in which the positive mechanical coupling between the steering wheel and the steering gear that is compulsory with conventional vehicle steering systems during the operation is disabled. The steering movement introduced by the driver into the steering wheel is then detected by a sensor, processed by a control and converted by an actuating drive as a function of the control into a steering angle of a steered wheel. On the part of the driver, a manual torque is applied to the steering wheel by means of a manual torque adjuster in order to simulate the actuation forces and reaction forces that are required for a safe driving.

With such steering systems it is possible to perform for example automatic cross wind corrections, counter steering and other steering operations without the steering wheel having to follow these steering movements. Operations of the autonomous driving can also be performed without the steering wheel turning in the process.

The requirements in terms of failure safety of such a steering system are particularly high. Accordingly, the steerability of the vehicle has to be ensured in any possible case of malfunctioning. For this purpose, redundancies and fallback levels are provided, for example in the case of systems with electromechanical actuating drive and electromechanical manual torque adjuster. With these systems, the steering shaft is disconnected between the two drives by means of a mechanical coupling in order to make possible the steer-by-wire function during the operation. In the event of a malfunctioning, the coupling is closed in order to establish a positive mechanical coupling between steering wheel and steering gear, as a result of which the steering system then remains actuatable similar to a conventional steering system and the vehicle can at least be brought safely to a halt.

A generic electromechanical steer-by-wire steering system is known from the document WO2014/038452A1. Here, the manual torque adjuster is arranged on the steering column in the vicinity of the steering wheel. The steering column is coupled, via a steering shaft, to a steering gear on which the electromechanical actuating drive, as in the case of an electromechanical power steering, is also arranged. The steering shaft can be selectively disconnected or connected by means of a coupling that is arranged between an upper part and a lower part. The disconnected state with opened coupling in this case is the operating state while the connected state with closed coupling represents the mechanical fallback level.

The arrangement is complicated in the manufacture and assembly because the steering column with the manual torque adjuster, the steering gear with the actuating drive and the steering shaft with the coupling are separate assemblies which have to be manufactured and assembled and which, above all, have to be connected to one another via electrical lines during the operation in such a manner that a particularly high malfunctioning and failure safety is achieved. Such a steering system is deemed expensive for using such steering systems in light and economical vehicles such as for example small and compact vehicles.

Thus a need exists for a steer-by-wire steering system that is less expensive to manufacture and assemble.

DETAILED DESCRIPTION

Figure 1:
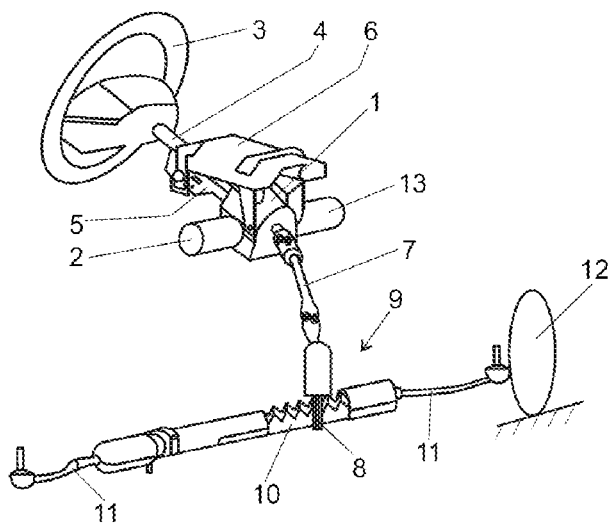
FIG. 1 is a perspective view of an example motor vehicle steering system with steer-by-wire functionality with an example actuating drive arranged on a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Since, in the case of a motor vehicle steering system with steer-by-wire function with an upper steering shaft, which is mounted in a steering column, and which can be connected to a steering wheel in a rotationally fixed manner, with a lower steering shaft, which is connected to a steering gear for pivoting at least one steerable wheel, and with a manual torque adjuster that is connected to the upper steering shaft, with an actuating drive that is connected to the lower steering shaft and with a coupling, which in the closed state couples the steering wheel and the steering gear to one another in a rotationally fixed manner, it is provided, furthermore, that the actuating drive is arranged on the steering column, the steering column, the coupling, the manual torque adjuster and the actuating drive can be produced, supplied and assembled as a common assembly. Then, the control on the vehicle side need merely be connected to this assembly so that it can be expected that this connection is particularly operationally safe. Because of this, the motor vehicle steering system becomes also easier to assemble. Stock keeping and assembly become less expensive.

When the actuating drive comprises an electric motor, which is arranged laterally on the steering column, this drive motor can be cooled more easily. Manufacturing different versions with varying electric power is simplified because of this. Preferably, the electric motor is designed as a synchronous motor.

Advantageously, the lower steering shaft is arranged, in terms of drive, between the actuating drive and the steering gear. Preferably, the steering gear is designed as a mechanical rack-and-pinion steering gear. In addition, it is advantageous when the manual torque adjuster and the actuating drive are arranged in a common gear housing since only one such housing will then have to be manufactured. In an advantageous further development, the gear housing is formed from a plastic. Thus, the mass of the assembly, compared with a metallic housing such as an aluminum or magnesium alloy, can be reduced.

Preferentially, the motor vehicle steering system is embodied so that the manual torque adjuster comprises an electric motor with an output shaft and an upper output wheel that is in engagement with the output shaft, which output wheel is connected to the upper steering shaft in a rotationally fixed manner and that the actuating drive comprises an electric motor with an output shaft and a lower output wheel that is in engagement with the output shaft, which is connected to the lower steering shaft in a rotationally fixed manner. Because of this, the construction of the entire arrangement is simplified.

When the upper output wheel and the lower output wheel with their axes of rotation are arranged coaxially to one another, the arrangement in a common housing is further simplified.

A particularly compact arrangement is obtained when the coupling is arranged in the force flow between the upper output wheel and the lower output wheel.

The coupling is particularly safe as fallback level even in the case of a complete failure of the power supply when the coupling is an electromagnetically actuatable snap-on coupling, which is closed in the currentless state.

In particular, the coupling can comprise an electromagnet and an armature that is connected to an output wheel in a rotationally fixed manner, wherein the armature is preloaded by means of a spring element away from the electromagnet into the closed position of the coupling, and that the armature is operationally connected to at least one engagement pin which, in the closed position, is in positive engagement with an engagement element that is connected to the other output wheel in a rotationally fixed manner.

A particularly reliable embodiment that is also low-noise during the operation is obtained when the output shafts are designed as worm shafts and the output wheels as worm wheels. Preferably, the respective worm wheel consists, at least partly, of a plastic, and particularly preferably the toothing of the respective worm wheel consists, at least partly, of a plastic. Because of this, the quietness of operation of the respective gear unit can be increased and the mass of the assembly reduced compared with a conventional purely metallic embodiment.

Proposed is a coupling for a motor vehicle steering system comprising a first coupling part that is rotatable about an axis of rotation, and a second coupling part that is rotatable about the axis of rotation, and at least two engagement pins, which are received in the second coupling part and are moveable relative to the same in the direction of the axis of rotation and at least two engagement elements, which are formed in the first coupling part, wherein at least one of the engagement pins and one of the engagement elements in a closed state are in engagement with one another, as a result of which the first coupling part and the second coupling part are coupled to one another in a rotationally fixed manner, and an electromagnet, comprising an armature and a stator, wherein the armature is operationally connected to the engagement pins, and the armature can be moved against the preload of a spring element by means of the switchable stator in the direction of the axis of rotation subject to driving the engagement pins, as a result of which the spring element preloads the engagement pins in the direction of the closed state. According to the invention, the engagement elements are formed as arc-shaped elongated holes or elongated slots.

In an opened state, all engagement pins are out of engagement with the engagement elements, as a result of which the first coupling part and the second coupling part can be rotated relative to one another about the axis of rotation.

By energizing the stator, the armature is moved, as a result of which all engagement pins are brought out of engagement and the spring element preloads the engagement pins in the direction of the closed state. In the case of an interruption of the energizing of the stator so that the armature is no longer held in position by the magnetic forces, a movement of the engagement pins in the direction of the engagement with the engagement elements takes place by means of the spring element. Here, a state can materialize that none of the engagement pins has come into engagement with the engagement elements yet, but all engagement pins are located in a standby position, so that after a minor relative rotation between the first and the second coupling part an engagement of at least one of the engagement pins in at least one of the engagement elements initially takes place. After a further minor relative rotation, the engaging of at least one further engagement pin in at least one of the engagement elements takes place. This takes place also in the case of a direction of rotation reversal between the engaging of the first and of the further engagement pin. By forming the engagement elements as arc-shaped elongated holes or elongated slots according to the invention, an engagement of the engagement pins can take place even after a minor rotation. In contrast with the forming of the engagement elements as circle-cylindrical bores, the engagement behavior can be improved since no exact meeting or a slow rotation of the first coupling part relative to the second coupling part pending the engaging of the engagement pins is required any longer, in other words, the secure engagement at high angular velocities between the first and the second coupling parts can thus be ensured.

By way of this coupling according to the invention, a particularly quick transfer from the opened state into the closed state can be achieved so that a quick and safe provision of a force flow between steering wheel and steering gear is ensured, wherein the first or the second coupling part is operationally connected to the steering wheel and the other one of the first or second coupling part is operationally connected to an input shaft of the steering gear. Because of this, the safety of the motor vehicle steering system, in the case of which the steering wheel and the steering gear are decoupled during normal operation, can be further increased since in the event of an emergency a mechanical feedthrough from the steering wheel to the steering gear can be provided in a very short time.

The arc-shaped elongated holes or the arc-shaped elongated slots are arranged in circumferential direction on a constant radius based on the axis of rotation, so that the engagement pins can enter into engagement with the elongated hole or the elongated slot. In other words, the engagement pins are radially spaced from the axis of rotation and the elongated holes or elongated slots comprise an identical radial distance to the axis of rotation so that the engagement pins can enter into engagement with the elongated holes or elongated slots.

In an advantageous further development, at least two engagement pins are in engagement with one or two of the engagement elements, wherein the one engagement pin transmits the rotation between the first and the second coupling part into a first direction of rotation and the second engagement pin transmits the rotation into a direction of rotation that is opposed to the first direction of rotation.

Because of the fact that each of the engagement pins transmits the rotation between the first and the second coupling part merely in one direction of rotation, a minor rotation play can be realized during the change of the direction of rotation since each of the engagement pins is, subject to very small play, which is required in order to again bring the engagement pins out of engagement, in a quasi direct positive contact with a flank of the engagement element.

In an advantageous further development, the coupling comprises at least three engagement pins, wherein in the closed state at least one of the three engagement pins is no longer in engagement with one of the engagement elements. This at least one engagement pin that is not in engagement is located in a standby position, in which this engagement pin is preloaded by means of the spring element.

In a further advantageous further development, the first or second coupling part is coupled to the manual torque adjuster via a first shaft in a rotationally fixed manner and the other one of the first or second coupling part is coupled to a second shaft, which is operationally connected to a rack of a steering gear.

This offers the advantage that the coupling according to the invention can be arranged in any position between the manual torque adjuster and the steering gear. Thus, an optimal adaptation to the existing installation space can be ensured.

In an advantageous further development, the spring element is designed as a disc spring. Preferably, the disc spring comprises leaf spring-like spring lugs which extend radially to the outside.

This offers the advantage that each engagement pin can be preloaded in engagement direction with a spring lug. Preferably, the disc spring comprises a spring steel plate or a plastic.

In FIG. 1, a motor vehicle steering system with steer-by-wire functionality with an actuating drive 2 arranged on a steering column 1 is shown. The steering system comprises, in a manner known per se, a steering wheel 3, which is connected to an upper steering shaft 4 in a rotationally fixed manner. The upper steering shaft 4 is mounted in a jacket tube 5, which in turn is pivotably held on a console 6. The console 6 is equipped for fastening to the body of a motor vehicle. A lower steering shaft 7 is connected to a pinion 8 of a steering gear 9 in a rotationally fixed manner. The pinion 8 meshes with a rack 10, which, via track rods 11, is connected to the steerable wheels 12 (only one is shown here). Since the shown steering system is a steer-by-wire system, a manual torque adjuster 13 is additionally provided which, like the actuating drive 2, is arranged on the steering column.

Figure 2:
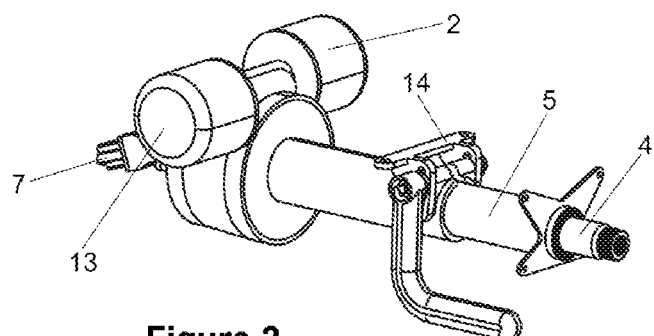
FIG. 2 is a perspective view of the example steering column of FIG. 1.

FIG. 2 shows the steering column of the steering system from FIG. 1 in another perspective representation. The upper steering shaft 4 is rotatably mounted in the jacket tube 5 which is provided with a clamping mechanism 14 in order to make possible the unlocking and locking for the vertical and axial adjustability.

The jacket tube 5 is connected to a gear housing 16 which carries the actuating drive 2 and the manual torque adjuster 13. The gear housing 16 is formed approximately cylindrically and centrally on its one front side carries the jacket tube 5, through the interior of which the upper steering shaft 4 is fed into the gear housing 16. On the other front side facing towards the back in FIG. 2, the lower steering shaft 7 likewise emerges centrally from the gear housing 16. The actuating drive 2 and the manual torque adjuster 13 are arranged on the gear housing 16 on the circumference side.

Figure 3:
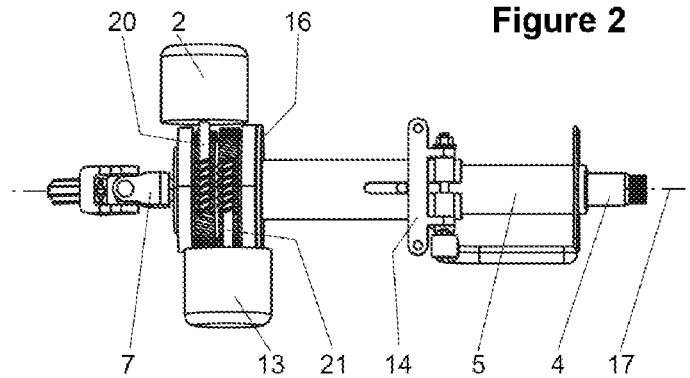
FIG. 3 is a plan view of the example steering column of FIG. 2.

FIG. 3 shows the steering column from FIG. 2 in a plan view. With respect to a longitudinal axis 17, which corresponds to the axis of rotation of the upper steering shaft 4, the manual torque adjuster 13 and the actuating drive 2 are arranged offset against one another in axial direction of the longitudinal axis 17, wherein the manual torque adjuster 13 lies nearer to the upper steering shaft 4. The gear housing 16 is opened in this representation, so that a worm shaft 20 as output shaft of the electric motor of the actuating drive 2 and a worm shaft 21 as output shaft of the electric motor of the manual torque adjuster 13 arranged approximately parallel thereto are visible.

Figure 4:
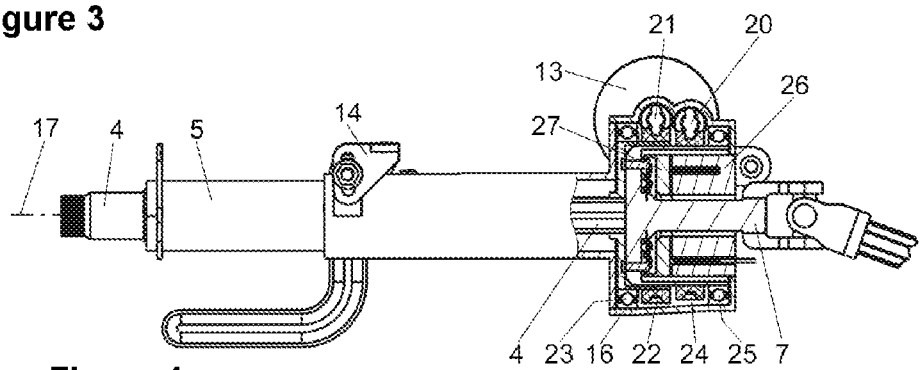
FIG. 4 is a side view of the example steering column of FIG. 2.

In the FIG. 4, the steering column from FIG. 2 is depicted in a lateral view, wherein the region of the gear housing 16 is shown in a longitudinal section. At its end arranged in the gear housing 16, the upper steering shaft 4 is connected with a pot-shaped output wheel 22, which, by means of a rolling bearing 23, is rotatably mounted about the axis 17 in the gear housing 16. At its outer circumference, the output wheel 22 comprises toothing which is compatible to the toothing of the output shaft 21 of the manual torque adjuster 13. A second pot-shaped output wheel 24 is likewise rotatably mounted in a rolling bearing 25 within the gear housing 16 and is in connection with the lower steering shaft 7 in a rotationally fixed manner. An outer circumferential toothing of the output wheel 24 is designed compatible with the toothing of the output shaft 20 of the actuating drive 2. An electromagnetic coupling 100 with a stator 26 and an armature 27 is arranged within the output wheel 24. The output wheels 22 and 24 are arranged coaxially to the axis 17.

Figure 5:
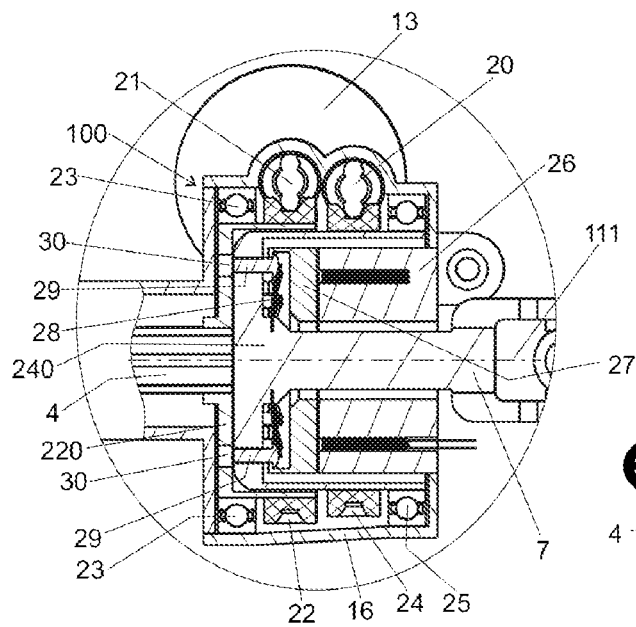
FIG. 5 is a longitudinal sectional view of an example gear of the steering column with opened coupling.

FIG. 5 shows a longitudinal section through the gear of the steering column described so far with opened coupling 100 in a more detailed representation. The stator 26 is designed as electromagnet and concentrically surrounds the lower steering shaft 7, wherein the steering shaft 7 is formed in one piece with the second coupling part 240. It is likewise conceivable and possible to connect the lower steering shaft 7 to the second coupling part 240 in a rotationally fixed manner by means of a shaft-hub connection. Such shaft-hub connections are sufficiently known from the prior art. The stator 26 can be attached to the gear housing 16 in a fixed manner. It is not required that it rotates with the lower steering shaft 7. However, the armature 27 is connected to the second coupling part 240 and to the lower steering shaft 7 in a rotationally fixed manner but axially moveable. The armature 27 is preloaded by a disc spring 28 in the direction facing away from the stator, wherein the armature 27 carries a number of engagement pins 29, which axially moveably sit in the engagement elements 30 of the output wheel 24 embodied as arc-shaped elongated holes (in the following synonymous with elongated holes). A first coupling part, which is connected to the output wheel 22 in a rotationally fixed manner comprises a number of engagement elements 30 which are parallel to the axis 17, in which the engagement pins 29, for coupling the output wheel 22 to the output wheel 24, can be brought into engagement.

In this embodiment version, the first coupling part 220 is designed as part of the output wheel 22 and the second coupling part 240 in this embodiment version is designed as part of the output wheel 24.

When the stator 26 is supplied with current, the magnetic field pulls the armature 27 against the stator 26 against the force of the spring element 28 designed as disc spring so that the armature 27 pulls the engagement pins 29 away from the output wheel 22 and out of the engagement elements 30 formed as arc-shaped elongated hole. The output wheel 22 and the output wheel 24 respectively the first coupling part 220 and the second coupling part 240 are then decoupled. Between the stator 26 and the armature 27, a minimum air gap is present in the state supplied with current, so that stator 26 and armature 27 do not touch one another.

Figure 6:
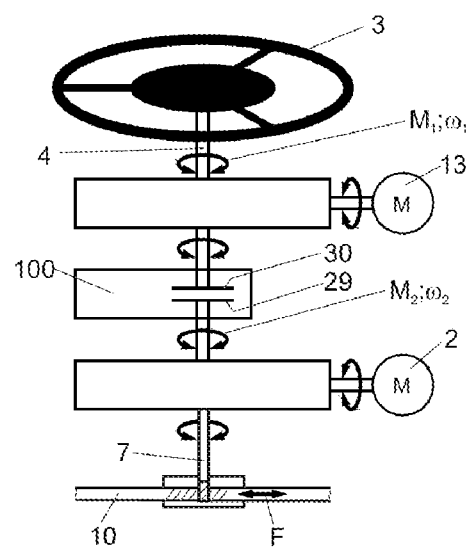
FIG. 6 is a schematic view of a torque flow in a steering with opened coupling.

FIG. 6 shows a schematic representation of the torque flow in a steering system with opened coupling 100 as shown in FIG. 5. The driver generates on the steering wheel as control signal an angle of rotation with a first angular velocity. The manual torque adjuster 13 then generates a manual torque which the driver perceives when actuating the steering wheel. The opened coupling 100 disconnects the upper and the lower steering shaft. As a function of a control which is not shown, the actuating drive 2 imposes a torque and an angle of rotation with a second angular velocity on the lower steering shaft 7, which leads to a corresponding force on the rack 10. The steering system operates as steer-by-wire steering system.

Figure 7:
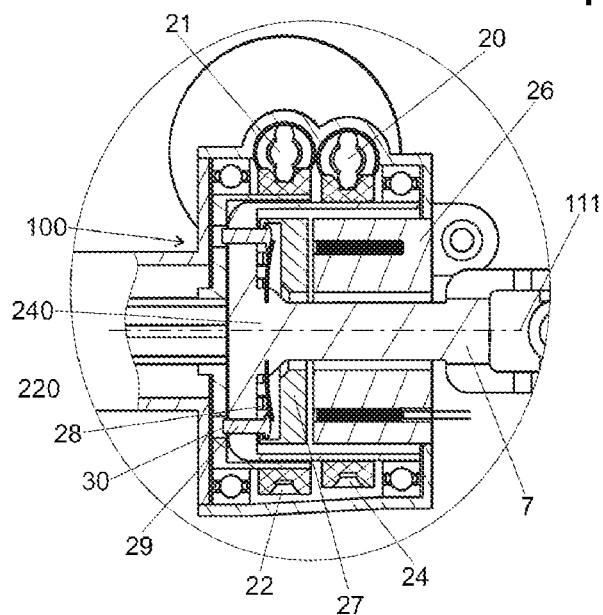
FIG. 7 is a longitudinal sectional view according to FIG. 5 with closed coupling.

FIG. 7 shows a representation according to FIG. 5, however with closed coupling 100. Some reference numbers were omitted for the sake of better clarity. In the event of a defect, the stator 26 is rendered currentless and the armature 27, because of the resetting force of the spring element 28, is consequently forced away from the stator 26 into the position shown in FIG. 7. The engagement pins 29 move with the armature 27 and engage in the engagement elements 30 formed as elongated hole. Here, the engagement elements 30 and engagement pins 29 are designed and arranged relative to one another so that at least one engagement pin 29 transmits the rotation merely in a first direction of rotation (clockwise rotation) and at least one second engagement pin transmits the rotation merely in a second direction of rotation (anti-clockwise direction). Because of this, a reduction of the play in the case of a change of direction of rotation can be realized since it is not required that an engagement pin moves from a contact surface to the contact surface of the engagement element located opposite, since an engagement pin already lies against this contact surface located opposite. The output wheel 22 and the output wheel 24 are thus coupled to one another in a rotationally fixed manner, likewise the upper steering shaft 4 and the lower steering shaft 7. A positive coupling between the steering wheel and the steering gear is established.

Figure 8:
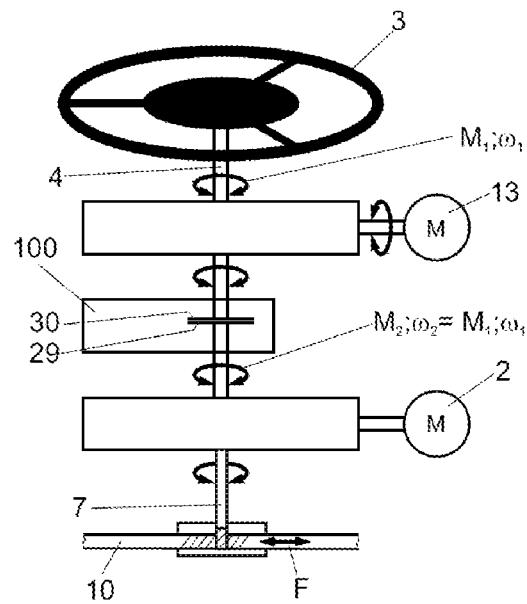
FIG. 8 is a schematic view corresponding to FIG. 6 with closed coupling.

FIG. 8 shows a representation according to FIG. 6 with closed coupling 100. Angle of rotation, angular velocity and torque values in the upper steering shaft 4 and the lower steering shaft 7 are identical. The steering system operates as a conventional steering system with rotationally fixed feedthrough from the steering wheel to the steering gear.

Figure 9:
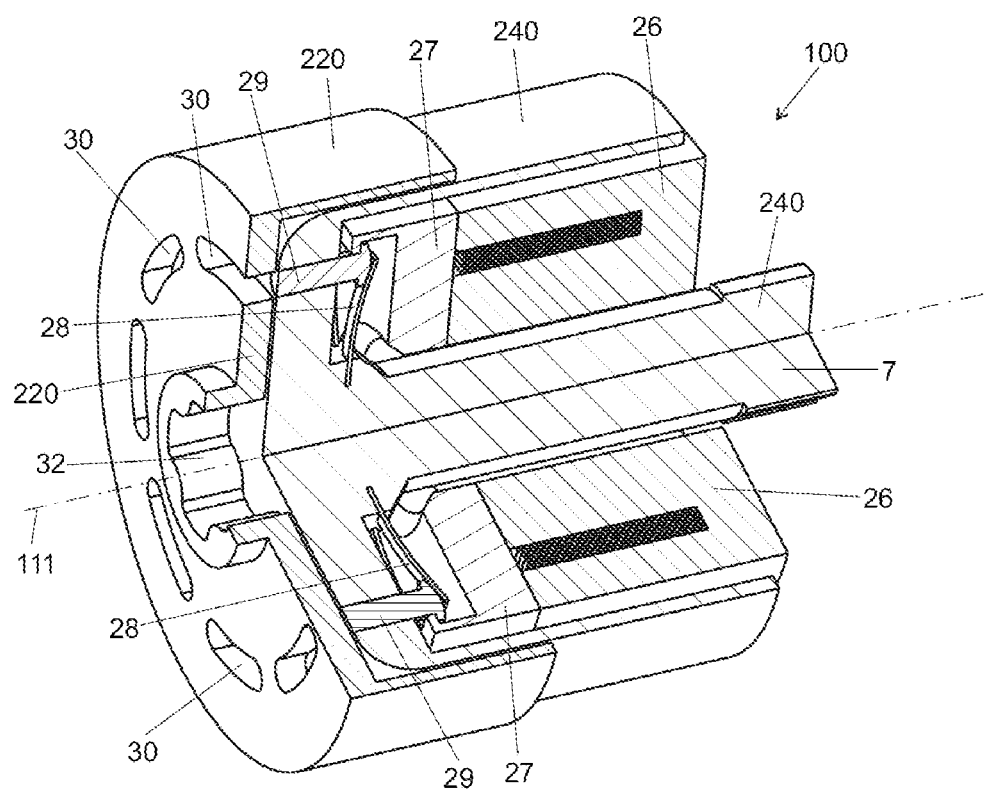
FIG. 9 is a perspective sectional view of the coupling in the opened state.

FIG. 9 shows a schematic perspective sectional representation of the coupling. For the sake of clarity, components, such as for example the bearings 23, 25 are not shown in this FIG. 9. The coupling 100 is in an opened state or in other words in the decoupled or disconnected state. The first coupling part 220 and the second coupling part 240 could thus rotate relative to one another. The engagement elements 30 of the first coupling part 220 formed as elongated holes are not in engagement with the engagement pins 29, which are received in a respective aperture, also called bore, of the second coupling part 240 and are preloaded by the spring element 28 in the direction of the closed state. The armature 27 is pulled up against the energized stator 26 under preload of the spring element, wherein the heads of the engagement pins 29 support themselves on protrusions which are directed claw-like radially to the inside and are held in position. In other words, the armature 27 is operationally connected to the engagement pins 29. The second coupling part 240 comprises a lower steering shaft 7 which is operationally connected to the steering gear 9. The first coupling part 220 comprises a connection 32 for the upper steering shaft 4 which is not shown. Obviously it is conceivable and possible to arrange the coupling so that the first coupling part is operationally connected to the steering gear 9 and the second coupling part is operationally connected to the upper steering shaft respectively the steering wheel 3.

Figure 10:
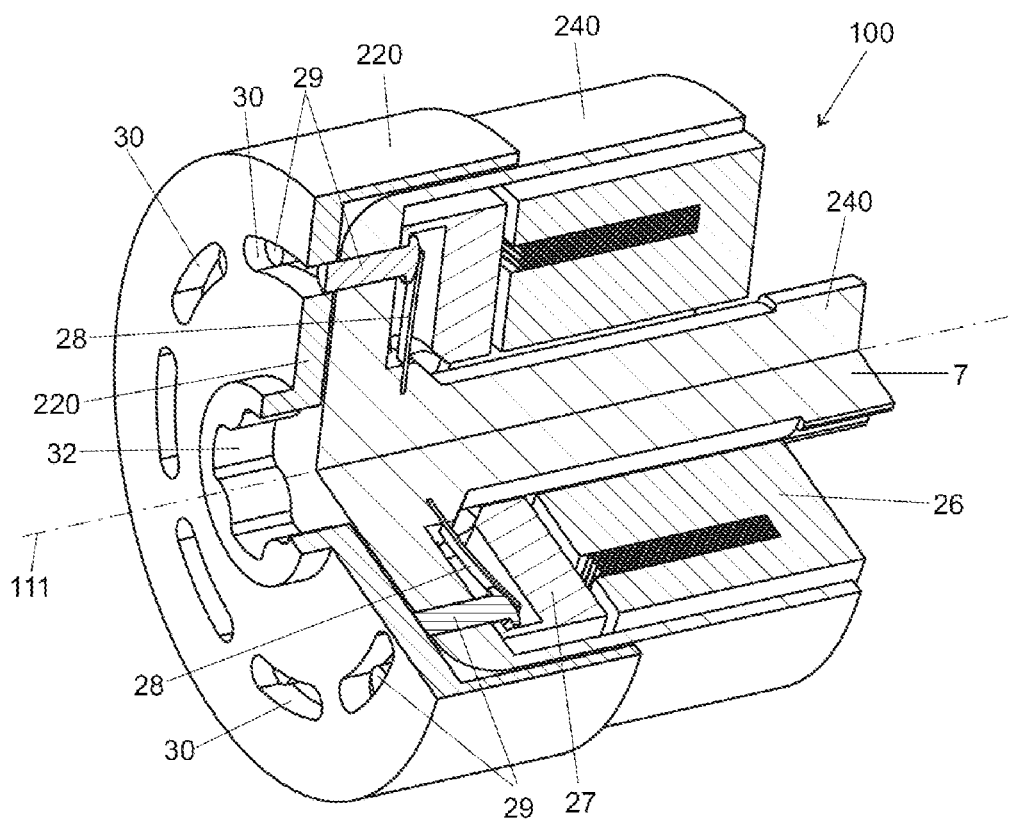
FIG. 10 is a perspective sectional view of the coupling in the closed state.

FIG. 10 shows a schematic perspective sectional representation of the coupling 100. For the sake of clarity, components, such as for example the bearings 23, 25, are again not shown in this FIG. 10. The coupling 100 is in a closed state or in other words in the coupled or connected state. The first coupling part 220 and the second coupling part 240 are not rotatable relative to one another since the engagement elements 30 of the first coupling part 220 formed as elongated holes are in engagement with the engagement pins 29, which are moveably received in the second coupling part 240 in the direction of the axis of rotation 111. With the de-energization of the stator 26, the engagement pins 29 preloaded by the spring element 28 and the armature 27 were axially moved in the direction away from the stator 26 and some engagement pins 29 were able to enter into engagement with the engagement elements 30 formed as elongated holes after a minor rotation of the first coupling part 220 relative to the second coupling part 240 at the latest. As is clearly evident, not all existing engagement pins 29 are in engagement with the engagement elements 30. This is indeed not required for achieving a safe, non-positive and non-rotatable coupling of the first and of the second coupling part. Because of the fact that more engagement pins 29 are present than can enter into engagement, it can be ensured that a first engagement pin 29 enters into engagement with one of the engagement elements 30 even after a minor angle of rotation of the first coupling part 220 relative to the second coupling part 240 and subsequently a second engagement pin 29 enters into engagement with one of the engagement elements 30. Thus, a quick transfer of the coupling from the opened into the closed state can be ensured. In this shown closed state, the steering wheel which is not shown and connected to the first coupling part 220 in a rotationally fixed manner and the steering gear which is not shown and connected to the second coupling part 240 in a rotationally fixed manner are operationally connected so that the rotary movement between the steering wheel and the steering gear is transmitted. Accordingly, a mechanical feedthrough between the steering wheel and the steering gear is provided for an emergency situation.

Figure 11:
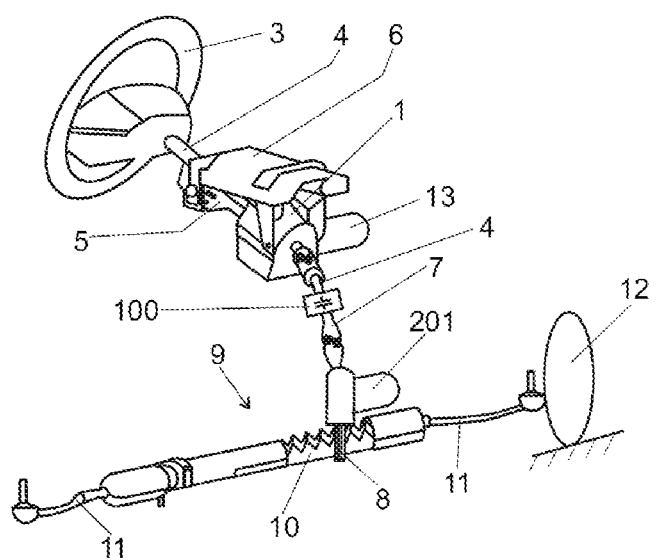
FIG. 11 is a perspective view of another example motor vehicle steering system with steer-by-wire functionality with an actuating drive arranged on a steering column.

In FIG. 11, an alternative arrangement of a steer-by-wire steering system is shown, wherein the manual torque adjuster 13 is arranged on the steering column and the actuating drive 201 on the steering gear 9, while a coupling 100 according to the invention is arranged as separate element in the region of the steering shaft between the two electromechanical actuators 13, 201. Here, the first coupling part is connected to the upper steering shaft 4 and the second coupling part to the lower steering shaft 7 in a rotationally fixed manner. The lower steering shaft 7 is coupled to the steering pinion 8 which meshes with the rack 10.

It is likewise conceivable and possible to arrange the coupling 100 according to the invention directly in the housing of the steering gear, wherein the first or the second coupling part is coupled to the steering pinion 8 in a rotationally fixed manner. Because of this, a compact construction can be realized.

Insofar as applicable, all individual features which are shown in the individual exemplary embodiments can be combined with one another and/or interchanged with one another without leaving the scope of the invention.

What is claimed is:

1. A motor vehicle steering system with steer-by-wire functionality, the motor vehicle steering system comprising:
    an upper steering shaft that is mounted in a steering column and is connectable to a steering wheel in a rotationally fixed manner;
    a lower steering shaft that is connected to a steering gear for pivoting a steerable wheel;
    a manual torque adjuster connected to the upper steering shaft;
    an actuating drive disposed on the steering column and connected to the lower steering shaft; and
    a coupling, wherein in a closed state the coupling couples the steering wheel and the steering gear in a rotationally fixed manner,
    wherein the manual torque adjuster comprises an electric motor with a first output shaft and an upper output wheel that is in engagement with the first output shaft, said first output shaft is connected to the upper steering shaft in a rotationally fixed manner, wherein the actuating drive comprises an electric motor with a second output shaft and a lower output wheel that is in engagement with the second output shaft, said second output shaft is connected to the lower steering shaft in a rotationally fixed manner, and
    wherein the coupling comprises an electromagnet with a stator and an armature that is connected to the lower output wheel in a rotationally fixed manner, wherein the armature is preloaded by way of a spring element away from the electromagnet into the closed state of the coupling, wherein the armature is operationally connected to an engagement pin, which in a closed position is in positive engagement with an engagement element that is connected to the upper output wheel in a rotationally fixed manner.

2. The motor vehicle steering system of claim 1 wherein the actuating drive comprises the electric motor is disposed laterally on the steering column.

3. The motor vehicle steering system of claim 1 wherein the lower steering shaft in terms of drive is disposed between the actuating drive and the steering gear.

4. The motor vehicle steering system of claim 1 wherein the manual torque adjuster and the actuating drive are disposed in a common gear housing.

5. The motor vehicle steering system of claim 1 wherein the upper output wheel and the lower output wheel are mounted coaxially rotatably relative to one another.

6. The motor vehicle steering system of claim 1 wherein the upper output wheel and the lower output wheel are mounted coaxially rotatably relative to one another in a common gear housing in which the manual torque adjuster and the actuating drive are disposed.

7. The motor vehicle steering system of claim 1 wherein the coupling is disposed in a force flow between the upper output wheel and the lower output wheel.

8. The motor vehicle steering system of claim 1 wherein the first and second output shafts are configured as worm shafts, wherein the upper and lower output wheels are configured as worm wheels.

9. The motor vehicle steering system of claim 1 wherein the coupling is an electromagnetically actuatable snap-on coupling, which is closed in a currentless state.

10. A coupling for a motor vehicle steering system, the coupling comprising:
    a first coupling part that is rotatable about an axis of rotation;
    a second coupling part that is rotatable about the axis of rotation;
    at least two engagement pins that are received in the second coupling part and are movable relative to the second coupling part in a direction of the axis of rotation;
    at least two engagement elements configured as arc-shaped elongated holes or elongated slots in the first coupling part, wherein at least one of the at least two engagement pins and at least one of the at least two engagement elements in a closed state are in engagement with one another, by way of which the first and second coupling parts are coupled to one another in a rotationally fixed manner; and
    an electromagnet comprising an armature and a switchable stator, wherein the armature is operationally connected to the at least two engagement pins, wherein the armature is movable by way of the switchable stator in the direction of the axis of rotation driving along the at least two engagement pins against a preload of a spring element, by way of which the spring element preloads the at least two engagement pins in a direction of the closed state.

11. A motor vehicle steering system with steer-by-wire functionality, the motor vehicle steering system comprising:
    an upper steering shaft that is mounted in a steering column and is connectable to a steering wheel in a rotationally fixed manner;
    a lower steering shaft that is connected to a steering gear for pivoting a steerable wheel;
    a manual torque adjuster connected to the upper steering shaft;
    an actuating drive disposed on the steering column and connected to the lower steering shaft; and
    a coupling, wherein in a closed state the coupling couples the steering wheel and the steering gear in a rotationally fixed manner, the coupling comprising:
        a first coupling part that is rotatable about an axis of rotation;

a second coupling part that is rotatable about the axis of rotation;

at least two engagement pins that are received in the second coupling part and are movable relative to the second coupling part in a direction of the axis of rotation;

at least two engagement elements configured as arc-shaped elongated holes or elongated slots in the first coupling part, wherein at least one of the at least two engagement pins and at least one of the at least two engagement elements in a closed state are in engagement with one another, by way of which the first and second coupling parts are coupled to one another in a rotationally fixed manner; and an electromagnet comprising an armature and a switchable stator, wherein the armature is operationally connected to the at least two engagement pins, wherein the armature is movable by way of the switchable stator in the direction of the axis of rotation driving along the at least two engagement pins against a preload of a spring element, by way of which the spring element preloads the at least two engagement pins in a direction of the closed state.

\* \* \* \* \*